April 17, 1928.  1,666,829
J. OLSON
WHEEL TIGHTENER
Filed Nov. 23, 1926  2 Sheets-Sheet 1
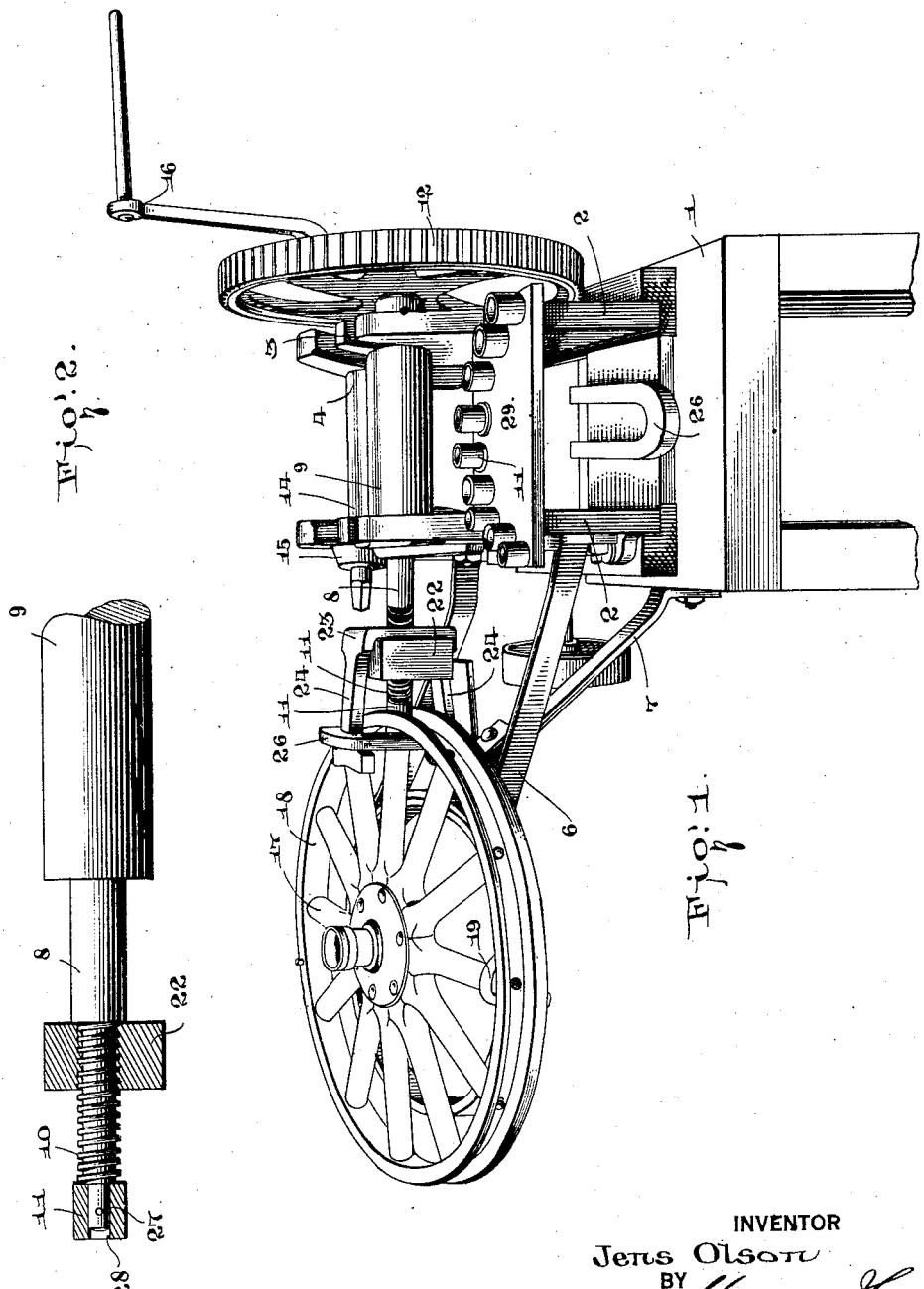
INVENTOR
Jens Olson
BY
ATTORNEYS April 17, 1928.  J. OLSON  1,666,829
WHEEL TIGHTENER
Filed Nov. 23, 1926  2 Sheets-Sheet 2
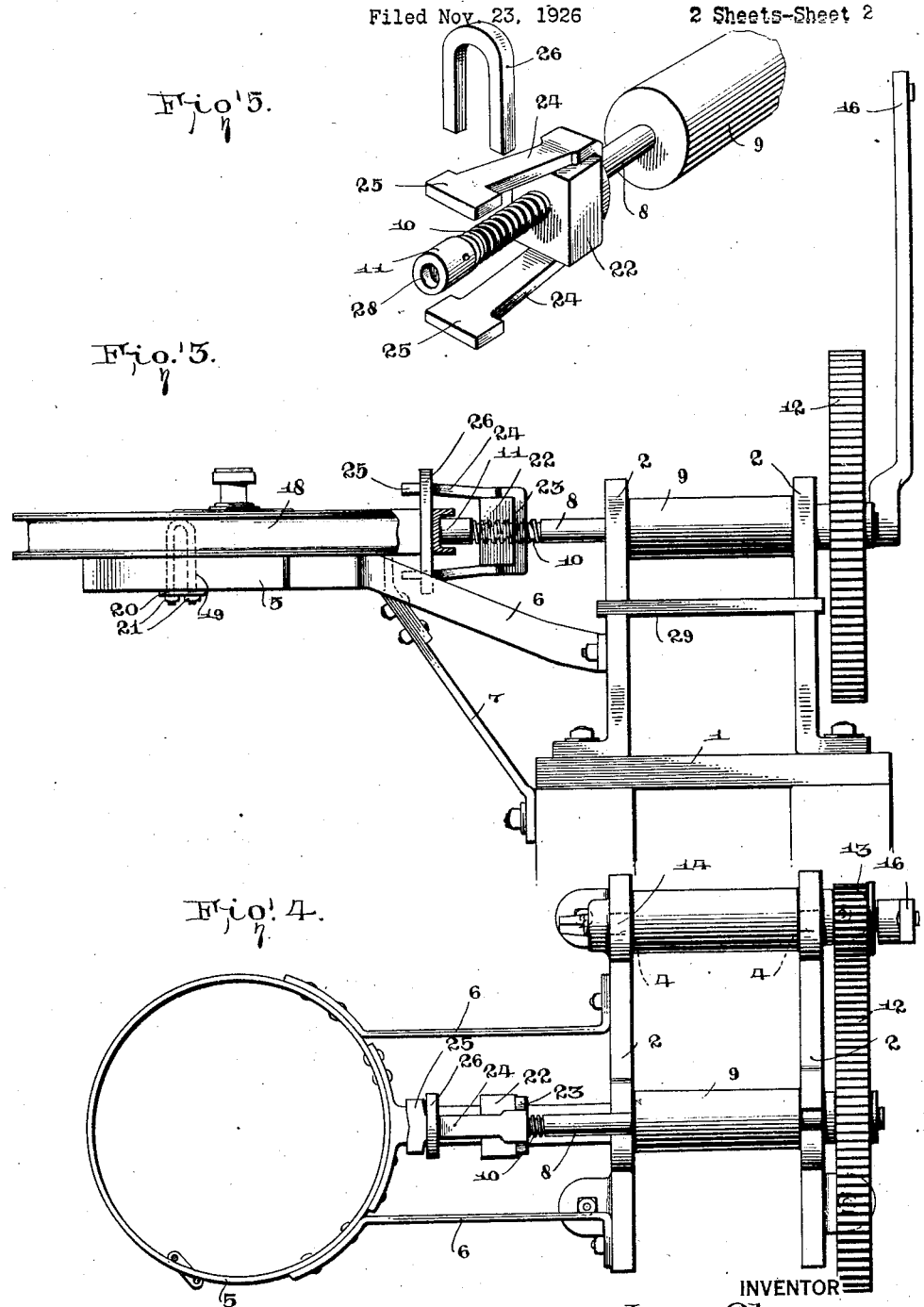
INVENTOR
Jens Olson
BY
ATTORNEYS Patented Apr. 17, 1928.

1,666,829

UNITED STATES PATENT OFFICE.

JENS OLSON, OF LEWISTON, IDAHO.

WHEEL TIGHTENER.

Application filed November 23, 1926. Serial No. 150,319.

My invention relates to improvements in devices for tightening the felly of a wheel having spokes, and it consists in the combinations, constructions and arrangements herein described and claimed.

An object of the invention is the provision of a wheel tightening device of the character described which affords facilities for making use of a relatively small force to exert a relatively great pressure on a wheel felly, tending to firmly secure a portion of the wheel felly to the associated spoke.

A further object of the invention is the provision of a wheel tightening device of the character described that is adapted for use with an automobile or truck wheel of any usual size.

A still further object of the invention is the provision in a wheel tightener of the character described of operating members which are adapted to be mounted on a supporting structure which may be a part of a tire bending or other machine such as customarily forms part of the equipment of a machine or other repair shop.

Other objects and advantages of the invention will be apparent from the following description, considered in conjunction with the accompanying drawings, in which, Figure 1 is a perspective view of the improved wheel tightener in position for use.

Figure 2 is a relatively enlarged view, partly in side elevation and partly in section, of a driven shaft and certain associated elements which are used in the improved wheel tightener.

Figure 3 is a front elevation of the improved wheel tightener with the supporting structure shown only fragmentarily, Figure 4 is a plan view of the structure exhibited in Figure 3.

Figure 5 is a perspective group view of certain of the cooperative elements of the improved wheel tightener.

The supporting structure of the improved wheel tightener may comprise a table or bench 1 having a pair of spaced supporting plates 2 upstanding from the top thereof and disposed vertically edgewise. The supporting plates 2 have pairs of alined bearings 3—3 and 4—4, respectively formed therein. The bearings 3—3 may be vertical notches or recesses in the upper edges of the supporting plates 2 as clearly shown in Figures 1 and 4. The bearings 4—4 may be alined openings in the plates 2 as shown in Figure 4.

A horizontally disposed supporting ring 5 is supported at one side of the table 1 above the level of the table top by means of a pair of supporting arms 6 which are secured to one of the supporting plates 2 and are inclined upwardly and outwardly from their places of connection with the supporting plate. The supporting ring 5 is stayed to the table 1 by an inclined brace bar 7.

A driven shaft 8 has portions journaled in the bearings 3 and can be lifted bodily from such bearings. The shaft 8 is held against any appreciable axial movement in the bearings 3 by a distance or spacing member 9 which may be an enlarged integral portion of the shaft 8 and which spans the space between the supporting plates 2.

The shaft 8 will be supported slightly above the level of the supporting ring 5 when portions of the shaft 8 are journaled in the bearings 3 in the manner hereinbefore described and one end portion of the shaft 8 extends from the adjacent bearing 3 in the direction of the supporting ring 5 and is provided with screw threads 10 for a part of its length and with an abutment head 11 at its extremity. The other end portion of the shaft 8 carries a relatively large gear wheel 12 which is in mesh with a small cooperating gear 13. The gear 13 is carried by a drive shaft 14 which has portions thereof journaled in the bearings 4. The drive shaft 14 is held against any appreciable axial movement in the bearings by the aforesaid gear 13 at one end of the shaft 14 and a stop collar 15 at the opposite end of the shaft 14 or in any other suitable known manner. The shaft 14 carries a crank handle 16 which can be manipulated to impart rotation to the shaft 14 and thence through the meshed gears 13 and 12 to the shaft 8.

The ring 5 is adapted to support a wheel of the type having spokes 17 and a felly 18 made of bendable material, preferably metal. This wheel may be disposed flatwise on the supporting ring 5 and loosely secured to the latter by suitable tie means such as the U-bolt 19, the plate 20 and the nuts 21 so that the wheel may have limited edgewise movement on the supporting ring 5 toward the abutment head 11 on the shaft 8.

A nut 22 which preferably is made of steel, is engaged with the threads 10 of the shaft 8 and is prevented against turning on the shaft when the device is in use by means which will now be described. Such means comprises a substantially U-shaped yoke having a web portion 23 provided with a central opening through which the threaded portion of the shaft 8 extends loosely and having a pair of vertically spaced arms 24 which straddle opposite faces of the nut 22 and extend beyond the abutment head 11. The respective arms 24 of the yoke are disposed above and below the edges of the adjacent portions of the wheel felly 18 and terminate in laterally enlarged head portions 25 which have portions extending laterally in opposite directions as shown.

A pressure applying member of substantially inverted U-shape is indicated at 26 and has arms adapted to straddle the arms 24 of the aforesaid yoke in contact with the inner faces of the opposite branches of the heads 25 of the yoke arms and between the heads 25 of the yoke arms and the inner periphery of the wheel felly. The arms of the pressure applying member 26 also straddle a spoke of the wheel on which a portion of the felly is to be secured.

From the foregoing description of the various parts of the device, the operation thereof may be readily understood. The nut 22 is adjusted initially on the threaded portion of the shaft 8 so that the arms of the pressure applying member 26 will contact with the inner periphery of the felly of the wheel that is supported on the ring 5 when the arms of the member 26 are in position to straddle the arms of the yoke 24 and a spoke of the wheel and the outer periphery of the wheel is in contact with the outer end of the abutment head 11 of the shaft 8. It will be noticed that the abutment head 11 is in contact with the felly of the wheel at the outer end of the spoke that is straddled by the arms of the member 26. With this arrangement, the nut 22 will be held against turning with the shaft as the latter is rotated and consequently, rotation of the shaft 8 will cause movement of the nut 22 longitudinally of the shaft. The crank handle 16 is manipulated as required to rotate the shaft 8 in the direction that is required to cause movement of the nut 22 away from the associated wheel and the arms of the member 26 therefore will force the portions of the felly at opposite sides of the interposed spoke against the abutment head of the shaft 8 and thus will drive or force the felly firmly to position on the spoke. The gear means which have been described for imparting a rotary motion to the shaft 8 permit a relatively small force to be used to effect a relatively great pressure on the felly of the wheel and this pressure can be discontinued when the tightening of the felly on the spoke has been effected and splitting or breaking of the spoke because of undue pressure thereon will be prevented.

As an additional means for preventing breaking or splintering of the spoke, it will be observed that the abutment head 11 is a tubular member that is secured on a reduced end portion of the shaft 8 by a pin 27 and that the outer end portion of the abutment head 11 extends beyond the corresponding end of the shaft 8 so that the bore 28 of the abutment head may receive the outer extremity of the aforesaid spoke of the wheel and therefore the pressure will be applied directly to the felly of the wheel and not against the spoke. Abutment head members 11 having different inner diameters may be used selectively according to the size of the spokes of the wheels which are to be tightened at different times, and in Figure 1 I show a plurality of reserve or extra abutment head members disposed on a shelf 29 on the supporting frame structure of the device. I also show in Figure 1 an extra pressure applying member 26 which is held in reserve for use when required.

The threads 10 of the shaft 8 preferably are of the square type and are of sufficient width at their apices to assure actuation of the nut when the shaft is rotated without stripping of the threads or injury thereto.

It is intended that the operating parts of the device shall be mounted on a supporting structure substantially as hereinbefore described and that such supporting structure may be comprised in any one of a plurality of different well known machines which ordinarily are used in machine shops, repair shops and like places for the bending of tires or other similar work.

Obviously, the invention is susceptible of embodiment in forms other than that which is illustrated in the accompanying drawings and I therefore consider as my own all such modifications and adaptations thereof as fairly fall within the scope of the appended claims.

What I claim is:

1. A device for tightening spoked wheels comprising a rotatably supported shaft, means for supporting a spoked wheel at one end of said shaft with the outer periphery of the felly of the wheel against the adjacent end of said shaft, a nut threadedly engaged with said shaft, a presser member adapted to straddle a spoke of said wheel and to contact the inner periphery of the felly of the wheel inwardly of the adjacent end of said shaft, means connecting said presser member with said nut for cooperating with said presser member and said wheel to prevent rotation of said nut and for forcing said presser member against the inner periphery of said wheel felly as said nut is moved on the shaft away from said wheel, a drive shaft parallel to said first named shaft, gear means for transmitting motion from said drive shaft to said first named shaft, and a crank for actuating said drive shaft.

2. A device of the character described comprising a supporting structure having a pair of aligned bearings, said bearings consisting of vertical notches open at their upper ends, a shaft having portions adapted to be journaled in said bearings, said shaft extending laterally of one side of said supporting structure, a ring supported from said supporting structure at the same side of the latter as the extending end of said shaft, said ring being adapted to support a spoked wheel with the outer periphery of the felly of said wheel against the adjacent end of said shaft, and means adjustable on said shaft when said shaft is rotated for exerting pressure against the inner periphery of said wheeled felly at opposite sides of a spoke and at opposite sides of the place of contact of the outer periphery of said wheel felly with said shaft.

3. A device of the character described comprising a supporting structure including a pair of spaced vertically edgewise plates, said plates having a pair of alined bearings, a shaft journaled in said bearings and extending laterally of one of said plates, a pair of supporting arms extending laterally of one of said plates, a ring carried at the outer ends of said supporting arms, said ring being adapted to support a spoked wheel with the periphery of the felly of the wheel against the outer end of said shaft, means for rotating said shaft, and means adjustable on said shaft for drawing the wheel felly toward the adjacent end of said shaft.

4. A device of the character described comprising a supporting structure including a pair of spaced vertically edgewise supporting plates having alined notches in their upper edges constituting bearings, a shaft having portions disposed in said bearings, a distance or spacing member on said shaft between said plates, said shaft extending laterally of one of said plates, a tubular abutment head on said extending end portion of the shaft, the bore of said abutment head being adapted to receive the outer end of a spoke of an adjacent spoked wheel, when said abutment head member is in contact at its outer end with the outer periphery of the felly of said wheel, a nut threadedly engaged with the extending end portion of said shaft, a substantially U-shaped yoke having an opening in its web through which said shaft extends, the web of said yoke being disposed inwardly of said nut and the arms of said yoke straddling opposite faces of said nut and also straddling the edges of the felly of said wheel, the arms of said yoke having enlarged end portions inwardly of the felly of said wheel, and a presser member having arms straddling the arms of said yoke and said spoke and being in contact with the inner periphery of said wheel felly, as and for the purpose described.

5. A device of the character described comprising a supporting structure including a pair of spaced vertically edgewise supporting plates having alined notches in their upper edges constituting bearings, a shaft having portions disposed in said bearings, a distance or spacing member on said shaft between said plates, said shaft extending laterally of one of said plates, a tubular abutment head on said extending end portion of the shaft, the bore of said abutment head being adapted to receive the outer end of a spoke of an adjacent spoked wheel, when said abutment head member is in contact at its outer end with the outer periphery of the felly of said wheel, a nut threadedly engaged with the extending end portion of said shaft, a substantially U-shaped yoke having an opening in its web through which said shaft extends, the web of said yoke being disposed inwardly of said nut and the arms of said yoke straddling opposite faces of said nut and also straddling the edges of the felly of said wheel, the arms of said yoke having enlarged end portions inwardly of the felly of said wheel, and a presser member having arms straddling the arms of said yoke and said spoke and being in contact with the inner periphery of said wheel felly, said presser member being of substantially inverted U-shape, as and for the purpose described.

6. A device of the character described comprising a supporting structure including a pair of horizontally spaced vertically edgewise supporting plates, a pair of inclined arms extending from one of said plates, a supporting ring carried by the outer ends of said supporting arms, an inclined brace staying said ring to said supporting structure, said ring being adapted to movably support a spoked wheel when said wheel is disposed flatwise on the ring, tie means loosely connecting a spoke of said wheel with said ring, a shaft journaled in said supporting plates and having an extending end portion terminating close to the outer periphery of the felly of said wheel, an abutment member on said extending end portion of the shaft for contact with the outer periphery of the felly of said wheel, and means supported on said shaft for exerting pressure against the inner periphery of the felly of said wheel at opposite sides of a spoke of the wheel when said shaft is rotated in a certain direction and the abutment member of said shaft is in contact with the outer periphery of the felly of the wheel at the outer end of said spoke.

JENS OLSON.